UNITED STATES PATENT OFFICE.

JOSEF ZIEGLER, OF BIEBRICH, GERMANY.

ANTISEPTIC QUINOLINE.

SPECIFICATION forming part of Letters Patent No. 478,495, dated July 5, 1892.

Application filed November 14, 1891. Serial No. 411,901. (No specimens.)

*To all whom it may concern:*

Be it known that I, JOSEF ZIEGLER, of Biebrich, in the Kingdom of Prussia and German Empire, have invented a new and useful Antiseptic Quinoline Compound, of which the following is a specification.

It having been proved that quinoline possesses great anti-bacterial properties, it became a matter of considerable importance that it should be rendered available for general use; but the complete insolubility of the strongly-basic substance presented an obstacle which it appeared could not be overcome without the use of strong mineral acids. After a long series of experiments I have succeeded in finding an unexpectedly-simple solution of the difficulty, as hereinafter described, so that there is now nothing in the way of the technical and commercial application and use of the substance as an antiseptic.

According to my invention I bring the quinoline into a state of solution in and during the saponification of saponifiable fats and oils. To fifty kilos of castor-oil are added fifty kilos of quinoline and a solution consisting of fifteen kilos of hydrate of potash in fifty kilos of water. This mixture is boiled until the saponification is completed, which stage is indicated by the clearing of the mixture, which had hitherto been cloudy and turbid. When the saponification has been completed, another eighty-five kilos of water are added, the mixture being meanwhile kept stirred. Any other suitable saponifiable fat or oil may be used in place of castor-oil—for example, olive-oil. The perfectly-clear liquid obtained is the antiseptic compound, and is soluble in pure water in all proportions. It has extraordinary valuable properties as an antiseptic disinfectant and anti-bacterial and is remarkably convenient in use.

What I claim, and desire to secure by Letters Patent of the United States, is—

1. A soluble antiseptic consisting of quinoline, combined with a saponaceous solution, prepared substantially as described.

2. The hereinbefore-described process for the manufacture of soluble quinoline antiseptics, which consists in saponifying oils or fats in the presence of quinoline, boiling until the solution is complete, and thereafter adding water to the solution, substantially as described.

In witness whereof I have hereunto set my hand in presence of two witnesses.

JOSEF ZIEGLER.

Witnesses:
 ALVESTO S. HOGUE,
 JEAN GRUND.